United States Patent [19]

Schade et al.

[11] 4,163,101
[45] Jul. 31, 1979

[54] METHOD OF PREPARING MODIFIED OR UNMODIFIED POLY-(ALKYLPENTAME-THYLENETEREPHTHALAMIDE)

[75] Inventors: Gerhard Schade, Witten-Bommern; Norbert Vollkommer, Troisdorf; Helmut Wemheuer, Bochum-Langendreer, all of Fed. Rep. of Germany

[73] Assignee: Dynamit Nobel Aktiengesellschaft, Cologne, Fed. Rep. of Germany

[21] Appl. No.: 803,338

[22] Filed: Jun. 3, 1977

[30] Foreign Application Priority Data

Jun. 18, 1976 [DE] Fed. Rep. of Germany ....... 2627342

[51] Int. Cl.$^2$ ............................................. C08G 69/28
[52] U.S. Cl. ...................................... 528/347; 526/71; 528/324; 528/349
[58] Field of Search .............. 260/78 R, 78 A, 857 R; 528/324, 347, 349

[56] References Cited

U.S. PATENT DOCUMENTS

| 3,379,695 | 4/1968 | Wolfes et al. | 260/78 R |
|---|---|---|---|
| 3,442,869 | 5/1969 | Wolfes et al. | 260/78 R |
| 3,459,714 | 8/1969 | Wolfes et al. | 260/78 R |
| 3,516,972 | 6/1970 | Wolfes et al. | 260/78 R |

Primary Examiner—Harold D. Anderson
Attorney, Agent, or Firm—Sprung, Felfe, Horn, Lynch & Kramer

[57] ABSTRACT

A process for preparing a poly-(alkylpentamethyleneterephthalamide) which comprises heating an aqueous solution of the corresponding nylon salt and still water soluble low molecular weight oligomer, the mixture of nylon salt and oligomer having 20 to 50 mole percent carbonamide groups and 50 to 80 mole percent salt groups, from a temperature at least as low as 150° C. at atmospheric pressure up to a polycondensation temperature of at least 250° C.

6 Claims, No Drawings

METHOD OF PREPARING MODIFIED OR UNMODIFIED POLY-(ALKYLPENTAMETHYLENETEREPH-THALAMIDE)

ORIGIN OF THE INVENTION

The invention described herein was made in the performance of work under a NAS contract and is subject to the provisions of Section 305 of the National Aeronautics and Space Act of 1958, Public Law 85-568 (72 Stat. 435; 42 USC 2457).

BACKGROUND OF THE INVENTION

1. Field Of The Invention

This invention relates to the preparation of poly-(alkylpentamethyleneterephthalamide), especially poly-(2-methylpentamethyleneterephthalamide), into which there can be incorporated by condensation up to 50 mole percent, with respect to the sum of all dicarboxylic acid or diamine moieties, of other diamines, dicarboxylic acids and/or aminocarboxylic acids or their lactams. More especially this invention contemplates a process for the preparation of such poly-(alkylpentamethyleneterephthalamides) wherein a pre-product is formed by heating an aqueous solution of the corresponding nylon salt and a still water soluble oligomide from a temperature of below 150°C. up to a polycondensation temperature of at least 250°C. The process is conducted preferably while maintaining the nylon salt-/oligomide mixture at a stirrable consistency while the same is heated up to a polycondensation temperature.

2. Discussion Of The Prior Art

Polyamides into which moieties of terephthalic acid and of 2-methylpentamethylenediamine, among others, are incorporated by condensation are already known. They are difficult to prepare by the melt condensation methods of the prior art. The reason for this is that the special diamine is easily cyclized to methylpiperidine, whereupon—as long as free diamine is present in the reaction mixture—ammonia is liberated. To the extent that one of the two amino groups of this diamine has already entered a carbonamide bond, a $CONH_2$ terminal group remains as a result of the formation of methyl piperidine, and acts to break the chain. The conventional melt condensation process as used, say, for the preparation of nylon 66, accordingly lead to high diamine losses which are not easy to compensate since the magnitude of these losses is not consistent.

Therefore, a method has already been proposed for the preparation of poly-(2-methylpentamethyleneterephthalamide) which consists in heating in a closed autoclave a mixture of terephthalic acid and 2-methylpentamethylenediamine with the amount of water necessary to dissolve the nylon salt formed from these substances, to bring it to temperatures that will permit the formation of amide groups. From this reaction mixture the oligoamides that form are isolated and refined and then condensed at still higher temperature with the removal of the equilibrium water present and of the newly formed reaction water (Japanese Pat. No. 19 551/69). It is well known that this process is not economical both on account of the complexity of the process and on account of the relatively low yields.

Accordingly, it has become desirable to provide a method for the preparation of poly-(alkylpentamethyleneterephthalamides) whereby the undesired secondary reactions mentioned supra can be minimized. Moreover, it has become desirable to provide such a process whereby the poly-(alkylpentamethyleneterephthalamides) are prepared such that they have a relative viscosity of at least 1.8 and preferably above 2.0.

SUMMARY OF THE INVENTION

In accordance with this invention there is provided a process for the preparation of poly-(alkylmethyleneterephthalamides) which is characterized by a marked reduction in the extent of undesired secondary reactions. In accordance with the process of the invention inhibition of condensation at temperatures below 150° C. is avoided by forming an aqueous solution of the corresponding nylon salt and still water soluble low molecular weight oligoamide such that the mixture of nylon salt and oligoamide has 20 to 50 mole percent carbonamide groups and 50 to 80 mole percent salt groups. The aqueous solution is heated at a temperature no higher than 150° C. at atmospheric pressure up to a polycondensation temperature of at least 250° C. By carrying out the process thusly, the polymerization mass is maintained constantly at a stirrable consistency, thereby precluding condensation inhibition at temperatures below 150° C.

This polymerization inhibition which is avoided by the process of the invention could not be obviated in commercial practice for the preparation of nylon 66 owing to the fact that when the nylon salt solutions were concentrated by evaporation at atmospheric pressure upon removal of the water there resulted a salt block which could no longer be stirred. This resulted in a polymerization inhibition. Polymerization of further condensation could only result once the temperatures were increased to above 150° C. and the salt block melted. Therefore, in order to be able to stir constantly and continuously assure the exchange of heat and substances it became common to heat the concentrated aqueous nylon salt solutions in closed autoclaves at temperatures above the melting point of the particular nylon salt. A chemical equilibrium then establishes itself, which results in a ratio of salt groups to carbonamide groups which is independent of the amount of water. This equilibrium, however, is stationary or constant for a certain period of time, i.e., a further reaction in the sense of an increase of the carbonamide groups at the expense of the salt groups does not take place meaning that further condensation of the mixture for this period of time is inhibited. It is not until a temperature above the melting point of the salt is reached that the pressure gradually returns to normal and a cessation of the condensation inhibition is achieved.

In accordance with the invention elimination of the undesired secondary reactions is achieved by initially forming an aqueous nylon salt/oligoamide mixture having 2-50 mole percent carbonamide groups and 50-80 mole percent salt groups. The nylon salts and the oligoamides are both soluble in the water. The mixture is then heated at a temperature no greater than 150° C. and preferably at least as low as 130° C. at normal (atmospheric) pressure up to the polycondensation temperature which is at least 250° C. By carrying out such a procedure no salt cake precipitates but rather a liquid state of aggregation of the mixture is preserved throughout.

It has been found that, in the preparation of poly-(2-methylpentamethyleneterephthalamide), which can contain up to 50 mole percent (with respect to the dicarboxylic acid component or the diamine component), if desired, of other dicarboxylic acids, diamines and/or aminocarboxylic acids, or lactams, incorporated into them by condensation, the solidification of the mixtures after the water has been removed by distillation at normal pressure can be prevented by concentrating by evaporation at atmospheric pressure mixtures of nylon salt and ologomers dissolved in water, which contain 20 to 50, preferably 25 to 45 mole percent carbonamide groups, and 50 to 80, preferably 55 to 75 mole percent of nylon salt groups. If these conditions are fulfilled, no solidification will occur after the water has been distilled out, and instead the temperature can be increased continuously above 100° C., without losing the stirrability of the mixtures.

The reason for this difference in comparison with the concentration of pure nylon salt solutions is apparently due to the lowering of the melting point of the nylon salt or of the mixtures of nylon salts below the 100° C. temperatures of boiling water, which is caused by the carbonamide groups. In an analogous manner, other poly-(alkylpentamethyleneterephthalamides) can also be prepared, although the method of the invention is preferentially applied to the preparation of poly-(2-methylene terephthalamide).

The subject matter of the invention is therefore a method for the preparation of poly-(alkylpentamethyleneterephthalamides), preferably poly-(2-methylpentamethyleneterephthalamide), containing, if desired, up to 50mole-% (with respect to the sum of all dicarboxylic acid moieties or diamine moieties) of moieties of other diamines, dicarboxylic acids and/or aminocarboxylic acids, or their lactams incorporated into them by condensation, characterized by heating aqueous solutions of the corresponding nylon salts mixed with also water-soluble oligoamides of low molecular weight, together with the structural units forming the nylon salts, doing so all the way through or at least from a product temperature of 130° to 150° C., at normal pressure, with distillation of the water and any other volatile components, until the final polycondensation temperature of 250° to 300° C., preferably of 260° to 280° C., is is reached. Then, the process is completed by condensation of the polymerization mass at normal (atmospheric) pressure or in vacuo in a conventional manner.

Generally speaking, the nylon salt is reacted with a still water soluble low molecular weight oligoamide in aqueous solution at temperatures preferably below about 150° C., especially temperatures in the range of 130° to 150° C. The reaction is preferably performed at atmospheric pressure. The reaction mixture is then heated, preferably continuously, up to the polycondensation temperature of at least 250° C.

The reaction of the nylon salt with the oligoamide takes place over a period of time of between 120 and 150 minutes at the temperatures below 150° C. The polycondensation at temperatures in exceess of 250° C. is performed over a period of time of between 2 and 5 hours. The heating of the reaction mixture from the initial (pre-condensation) temperature up to the polycondensation temperature takes between 150 and 180 minutes.

To achieve the stated amide group concentration in the precondensate, a variety of methods are applicable in principle. For example, one can, by means of solution or boundary-surface condensation, produce from terephthaloylchloride and an alkylpentamethylenediamine, preferably 2-methylpentamethylenediamine, the starting substances not being present in stoichiometric quantity ratios, to produce oligoamides which can be added in the concentrations of the invention to the aqueous nylon salt solutions which are to be concentrated by evaporation, and through their presence prevent precipitation of the nylon salt when the water is removed by evaporation at normal (atmospheric) pressure. The oligoamides to be added to the aqueous nylon salt solutions can also be obtained in other ways, such as, for example, by the reaction of diphenylterephthalate with non-stoichiometric amounts of 2-methylpentamethylenediamine, etc., although these and other such methods are not preferred since they are complicated and expensive.

In order to obtain an aqueous solution of a mixture of oligoamide and nylon salt at low temperatures and under easy-to-achieve conditions, such mixture being referred to hereinafter as a "precondensate", it is preferred to operate by the method of German "Offenlegungsschrift" No. 1,495,393, (= U.S. Pat. No. 3,454,536), the disclosure of which is hereby specifically incorporated herein by reference, in which dimethylterephthalate is reacted with any diprimary aliphatic diamine and water under normal pressure at about 90° to 100° C. to form a "precondensate." The concentration of amide groups in the "precondensate" will in this case be higher as the amount of water used is lower with respect to the dimethylterephthalate. This amount of water, however, cannot be made arbitrarily small, however, since at a concentration below about 45 parts by weight water per 100 parts by weight dimethylterephthalate, secondary reactions occur which manifest themselves in melting point reductions and/or in disturbances during the polycondensation reaction that follows. In order to achieve as high as possible an amide group concentration, provision is made in a preferred embodiment of the invention for performing the preliminary reaction with a dimethylterephthalate-to-water ratio of from about 100 to 45 to about 100 to 100 parts by weight, at 90° to 100° C. and over a time period of between 5 and 10 hours.

This invention further contemplates a process in which the aqueous mixture of nylon salt and oligoamide is prepared by the reaction of dimethylterephthalate with virtually equivalent amounts of an alkylpentamethylenediamine, preferably 2-methylpentamethylenediamine, in the presence, if desired, of other polyamideforming starting substances, in the presence of 45 to 100 weight-parts of water per 100 weight-parts of dimethylterephthalate, at 90° to 100° C., over a period of at least 5 to 10 hours, with distillation of the methanol that forms.

The minimum time periods to be applied are disclosed in German "Offenlegungsschrift" No. 1,495,393, (= U.S. Pat. 3,454,536) i.e., at least between 3 and 10 and preferably between 5 and 10 hours.

As soon as the methyl ester group content in the starting mixture has been reduced to the desired level, preferably 10% or less of the original amount, the water, which may still contain methanol, is removed by distillation.

The reaction conditions in the preparation of the precondensates are to be selected such that, immediately before the actual polycondensation of the substantially water-free precondensate, its content of methyl ester groups will be at most 6% of the original amount of methyl ester groups charged.

It is also possible that, occasionally, the small water concentration to be used in preparing the precondensate will not suffice to yield homogeneous precondensate solutions, and that, in the course of the preliminary reaction, high-melting nylon salts will crystallize out and the reaction mixture, still containing water, will stiffen. In these cases it has proven to be desirable to continuously add just enough water to assure sufficient stirrability, and, after the time provided for the preliminary reaction has ended, to add so much additional water that a largely homogeneous solution is formed. In this manner, on the one hand the carbonamide group concentration in the reaction mixture will be kept as high as possible, and on the other hand provision will be made for an intimate mixing of nylon salt and oligoamides prior to the evaporation of the water, which is essential to an optimum lowering of the melting point of the precondensate.

If no additional diamines and/or dicarboxylic acids are used which might lower the mixed melting point of the nylon salt mixture to close to 100° C., it is desirable to use the smallest possible amount, of 45 to 55 weight-parts per 100 weight-parts of dimethylterephthalate. If, however, additional diamines and/or dicarboxylic acids are used in higher concentrations, so that the nylon salt mixture melts at relatively low temperatures, the water concentration will be less critical, since the required further reduction of the melting point of this nylon salt mixture below 100° C. will be brought about by a relatively low concentration of carbonamide groups in the precondensate.

It has indeed been stated in German "Offenlegungsschrift" No. 1,495,393 (=U.S. Pat. No. 3,454,536) that the procedure described therein makes it possible in many cases to remove the water continuously by evaporation at normal pressure from the preliminary reaction mixtures, and then to increase the temperature, without the occurrence of any stiffening of the reaction product. It was unknown, however, and unforeseeable, that particularly in the case of the use of 2-methylpentamethylenediamine for the preparation of polyamide, it is precisely this possibility that determines the success of the polycondensation reaction.

Aside from the already treated question of the performance of the reaction in the presence of water, the following considerations are important in providing a suitable procedure for the preparation of such alkylpentamethylenediamine-based polyamides on poly-(2-methylpentamethyleleterephthalamide.

(1) Polyamides which contain, for example, moieties of terephthalic acid and 2-methylpentamethylenediamine are often so viscous at polycondensation temperatures that their substantially complete removal from reaction vessels is impossible. The product residue remaining in these vessels is decomposed, first hydrolytically and then thermally, as the next batch is loaded in and condensed, so that a re-polycondensation of this residue cannot be brought about. The result of this is that the degree of polycondensation that can be achieved decreases from batch to batch. Accordingly, the full condensation, assuming a reaction vessel residue of, say 10 to 20%, can be performed only in a stirrer vessel which has been freshly boiled out each time, or the condensation must be performed in self-cleaning dual screw extruders.

(2) If the last-named, continuously operating condensation process is to be used, the following must also be observed: The reactivity of the melt will not remain unchanged for a period of 8 to 10 hours unless its temperature does not exceed about 130° to 150° C. This temperature depends within certain limits on the material of the reactors in which the preparation and concentration of the still moist preliminary reaction product is performed, since metal ions dissolved out of this material catalyze the decomposition of the amine terminal groups. Consequently, it is necessary to change over from a discontinuous to a continuous procedure beginning at this temperature of 130° to 150° C. at the latest. This changeover requires the interposition of a buffer vessel in which the melt held therein has to retain its reactivity over a relatively long time.

In the temperature range up to about 230° C. (after which temperature the entry into the self-cleaning dual screw extruder can take place), the products generally do not reach such a high melt viscosity that (assuming a stirring action) they fail to form horizontal surfaces. A continuously operating reactor that can be used in this stage of the polycondensation can therefore be, for example, a heatable, horizontal trough of U-shaped cross section and a driving screw running along the bottom and walls, if it is desired to avoid more expensive, known apparatus of different design, which serve the same purpose. One can, on the other hand, pour or drop precondensates concentrated by evaporation to a temperature of 110° to 130° C. into apparatus heated at about 250° C., without explosive vaporization of the equilibrium water contained in it and without damage to the reactivity of the melt. Accordingly, there are theoretically no limits to the speed with which the heating up of the substantially water-free precondensate can take place. There is no need, therefore, to pass the precondensates through different heated zones in the continuous heating.

EXAMPLES

The examples given below are intended only to further explain the invention, but not to limit it.

EXAMPLE 1

The following were weighed into a 250 ml round flask equipped with stirrer, nitrogen introduction tube and a descending condenser:

34.92 g of dimethylterephthalate (0.18 mole)

3.32 g of isophthalic acid (0.02 mole)

23.9 g of 2-methylpentamethylenediamine plus a content of 5% of 2-ethyltetramethylenediamine (0.206 mole)

16 g of water (46 wt.-% with respect to dimethylterephthalate)

60 mg of phosphorous acid.

This reaction mixture was stirred for 7 hours at 90 to 95° C. at atmospheric pressure, after the air had been displaced by nitrogen. Then the temperature was increased continuously over a period of 4 hours to 280° C. with distillation of the methanol and water mixture, and was maintained at this level for another 5 hours. After cooling, a nearly colorless, tough, hard and transparent object was obtained, whose relative viscosity, measured in concentrated sulfuric acid at 25° C. at a concentration of 1 g of polymer in 100 ml of solution, had reached a value of 2.78. The glass transformation temperature of the polymer was found by means of differential thermoanalysis to be 142° C.

Upon the concentration of the water-containing reaction mixtures, which, in accordance with German "Offenlegungsschrift" No. 1,495,393(=U.S. Pat. No. 3,454,536), contained 34 to 35 mole-% of amide groups and about 60 mole-% of nylon salt groups in view of the concomitant use of free isophthalic acid, some turbidity occurred temporarily, but did not interfere with continuous stirrability.

EXAMPLE 2

Example 1 was repeated, with the difference that the continuous temperature increase from 100 to 280° C. took place over a period of 12 hours (as compared with 4 hours in Example 1). The appearance and the stirrability of the melt in this case was virtually the same as in Example 1. The final condensation under the conditions of Example 1 yielded a product having a relative viscosity of 2.80. The reactivity had thus not been impaired by operation at normal pressure under the influence of the generally extended application of heat.

EXAMPLE 3

The water-containing precondensate prepared as in Example 1 (reaction mixture stirred for 7 h at 90°–95° C.) was heated in an autoclave under nitrogen to raise the temperature to 240° C. over a period of 3 hours, a pressure of approximately 28 atmospheres developing.

Then, while the temperature was sustained, the pressure was decreased over a period of 3 hours to normal pressure, the emerging vapors being passed through hydrochloric acid. The titration of this hydrochloric acid showed a loss in this experiment of 0.0684 "basic equivalents", which corresponds theoretically to a loss of 0.0342 mole of diamine. This signifies that there was left behind in the reactor a reaction mixture which can have contained no more than about 84 moles of diamine moieties per 100 moles of dicarboxylic acid moieties. The reaction product, accordingly, could be condensed no further either under normal pressure or with the application of a vacuum, and furthermore it was greatly discolored. From this experiment it is apparent that the conventional polyamide preparation method, such as is technically used in the production of nylon 6/6, is not usable in the case of polyamides containing substantially 2-methylpentamethylenediamine incorporated into them by condensation.

EXAMPLE 4

Example 1 was modified by increasing the concentrations of water in the preliminary reaction (with reference in each case to 100 wt.-parts of dimethylterephthalate).

| Water | CONH concentration in accordance with German Offenlegungsschrift 1,495,393 (= U.S. Pat. 3,454,536) |
|---|---|
| a) 75 wt.-parts | 28 – 29 mole-% |
| b) 100 wt.-parts | 26 – 27 mole-% |
| c) 150 wt.-parts | 23 – 24 mole-% |

In Example 4a, when the aqueous solution was concentrated, more turbidity occurred than in Example 1, while the stirrability remained virtually unimpaired. In Example 4b, still greater turbidity occurred when the aqueous solution was concentrated, and the stirrability was markedly impaired, while in Example 4c, when the aqueous solution was concentrated, a dough-like or glue-like consistency was temporarily produced, which greatly interfered with the stirring.

From this series of experiments it can be seen that the reaction conditions should be arranged so that the concentration of carbonamide groups in the water-containing preliminary reaction product will amount to at least 20 mole-%, but preferably more.

EXAMPLE 5

Example 1 was varied by lowering the water concentrations in the preliminary reaction (with respect to 100 weight-parts of dimethylterephthalate in each case).

| Water | Maximum Relative Viscosity |
|---|---|
| a) 40 wt.-parts | 2.55 |
| b) 35 wt.-parts | 2.20 |
| c) 20 wt.-parts | 2.08 |
| d) 10 wt.-parts | 1.38 |

No impairment of stirrability was produced in any of these experiments. It is seen, however, that reducing the water concentration below about 45 weight-parts per 100 weight-parts of dimethylterephthalate in the preliminary reaction makes it difficult or impossible to achieve sufficiently high degrees of polycondensation.

EXAMPLE 6

The following were reacted together by the method described in Example 1:
38.8 g of dimethylterephthalate (0.2 mole)
23.9 g of 2-methylpentamethylenediamine containing 30% of 2-ethyltetramethylenediamine (0.206 mole)
19.5 g of water (50 wt.-% with respect to dimethylterephthalate)
50 6 phosphorous acid.

A polyamide was obtained without difficulty, whose relative viscosity was found to be 2.80 and whose glass transformation temperature was 145° C.

EXAMPLE 7

By the method described in Example 1, the following were reacted together:
31.0 g of dimethylterephthalate (0.16 mole)
6.64 g of isophthalic acid (0.04 mole)
20.75 g of 2-methylpentamethylenediamine containing 5% of 2-ethylpentamethylenediamine (0.176 mole)
7.14 g of 3,3'-dimethyl-4,4'-diaminodicyclohexylmethane (0.03 mole)
16.00 g of water
50 mg of phosphorous acid.

When the water was distilled out, the solution became temporarily turbid, without losing its stirrability. The end product was clear and transparent. It had reached a relative viscosity of 2.75; the glass transformation point was found to be 151° C.

EXAMPLE 8

The following were reacted together by the method described in Example 1:
21.34 g of dimethylterephthalate (0.11 mole)
4.98 g of isophthalic acid (0.03 mole)
11.28 g of azelaic acid (0.06 mole)
15.53 g of 2-methylpentamethylenediamine (0.134 mole)
17.16 g (3,3'-dimethyl-4,4'-diaminodicyclohexylmethane (0.071 mole)
30 g of water
100 mg of phosphorous acid.

The clear aqueous solution of the preliminary reaction product became turbid after the water was distilled out, beginning at a temperature of 150° C., but it remained stirrable. After about 250° C., the melt became clear again. The final condensation under the conditions given in Example 1 resulted in a product whose relative viscosity was only 2.41 due to its very high melt viscosity alone, since further condensation to values over 3.0 proved to be possible if a vacuum was applied. A glass transformation temperature of 160° was found.

EXAMPLE 9

Example 8 was modified by reacting the dimethylterephthalate with the 2-methylpentamethylenediamine in a first stage, in the presence of only 10 ml of water, for 7 hours at 90 to 100° C., and then another 25 ml of water was added, plus the rest of the diamines and dicarboxylic acids, as well as the phosphorous acid. The resulting clear, aqueous solution was then concentrated and polycondensed as described. In this method of procedure, the turbidity phenomena mentioned in Example 8 were hardly perceptible. The reason for this is obviously the difference in the procedure in comparison with Example 8, which brought about a higher concentration of carbonamide groups in the precondensate.

EXAMPLE 10

A precondensate solution prepared in accordance with Example 1 and concentrated by evaporation up to a temperature of 110° C., was placed under nitrogen at atmospheric pressure in a heated dropping funnel whose wall temperature was 120° C., and was let fall drop by drop into a glass-jacketed glass tube sloping at an angle of about 45° from the horizontal, in which oil was flowing through the jacket at a temperature of 250° C. This glass tube was 30 cm long and had an inside diameter of 4 cm. To the bottom end of this glass tube a round flask was fitted, while at the upper end a gas outlet opening was provided. Nitrogen was slowly introduced into the flask, and left the glass tube at the gas outlet opening. The concentrated precondensate was thus let fall drop by drop into the tube at a rate of about 15 to 20 cm³ per minute, and large gas bubbles formed where the drops struck the tube, but produced no spatter when they burst. The product ran continuously in thick, viscous layers into the round flask under the glass tube, where it solidified; the time of stay of the melt in the glass tube amounted to about 20 minutes, but varied with the thickness of the layer that formed. The experiment was terminated after 2 hours. The content of the glass flask had relative viscosities which, despite the fact that the reaction conditions were kept constant, varied between 1.8 and 2.3. By melting down small test quantities (at about 280° C.) and applying a vacuum (approx. 1 Torr), however, consistent relative viscosities between 2.9 and 3.2 were reached within 30 minutes, indicating that the reactivity of the mixture had been preserved despite the shock-like heating it had undergone.

Example 11

The following were reacted by the method described in Example 1:
38.8 g of dimethylterephthalate (0.2 mole)
23.9 g of 2-methylpentamethylenediamine (0.206 mole)
35 ml of water
60 mg of phosphorous acid.

After 5 hours of reaction time at 90°–95° C., another 2 ml of water was added and, after another 3 hours, another 2 ml, in order to obtain a precondensate solution of maximum homogeneity. This was concentrated for 60 minutes until the internal temperature increased to 120° C. The solution was then heated through the temperature range from 120° to 300° C. over a period of 1 hour, the stirring becoming momentarily difficult in the 150° to 250° C. temperature range due to the precipitation of high-melting oligomers. At 300° C., the melt was only slightly turbid and already very viscous. After 5 hours at 300° C., the experiment was discontinued. The cooled, crystallized product had a relative viscosity of 2.35. Another melting at 300° C. to form a layer about 3 mm thick and the application of a vacuum of about 1 Torr for 30 minutes increased the relative viscosity to 3.35.

What is claimed is:

1. A process for preparing a poly-(alkylpentamethyleneterephthalamide) having a relative viscosity of 1.38 to 3.35, measured in concentrated sulphuric acid at 25° C. at a concentration of 1 gram of polymer in 100ml of solution, which comprises heating an aqueous solution of the salt of terephthalic acid and alkylpentamethylenediamine and a water soluble low molecular weight oligoamide of said terephthalic acid and said alkylpentamethylenediamine, the mixture of said salt and oligoamide having a 20–50 mole percent carbonamide groups and 50–80 mole percent salt groups, from a temperature in the range of 130° to 150° C. at atmospheric pressure up to a polycondensation temperature in the range of 250° to 300° C.

2. A process according to claim 1 wherein the solution is heated up to a temperature of 260° to 280° C.

3. A process according to claim 1 wherein the aqueous nylon salt-oligoamide solution is prepared by the reaction of dimethylterephthalate with an alkylpentamethylenediamine in the presence of 45–100 weight-parts of water per 100 weight-parts of dimethylterephthalate at 90 to 100° C. in the course of at least 5 to 10 hours with removal of the split-off methanol by distillation.

4. A process according to claim 3 wherein said alkylpentamethylenediamine is 2-methylpentamethylenediamine.

5. A process according to claim 3 wherein said alkylpentamethylenediamine is contacted with said water in the presence of other polyamide-forming starting substances.

6. A process according to claim 1 wherein said water soluble low molecular weight oligoamide is a water soluble low molecular weight oligoamide of said terephthalic acid, said alkylpentamethylenediamine and another dicarboxylic acid, diamine, aminocarboxylic acid or lactam.

* * * * *